United States Patent [19]

Kazama et al.

[11] Patent Number: 5,237,475
[45] Date of Patent: Aug. 17, 1993

[54] MAGNETIC HEAD FOR PHOTO-MAGNETIC RECORDING

[75] Inventors: Toshio Kazama; Toshihiro Kuriyama, both of Nagaoka, Japan

[73] Assignee: Alps Electric Co., Ltd., Tokyo, Japan

[21] Appl. No.: 4,774

[22] Filed: Jan. 14, 1993

Related U.S. Application Data

[63] Continuation of Ser. No. 626,646, Dec. 12, 1990, abandoned.

[30] Foreign Application Priority Data

Dec. 26, 1989 [JP] Japan ............................. 1-149560[U]

[51] Int. Cl.⁵ ........................ G11B 21/20; G11B 7/08
[52] U.S. Cl. .................................. 360/104; 360/103; 360/114; 369/13; 369/244
[58] Field of Search ................... 369/13, 244; 360/103, 360/104, 114

[56] References Cited

U.S. PATENT DOCUMENTS

| | | | |
|---|---|---|---|
| 3,665,434 | 5/1972 | Applequist et al. | 360/103 |
| 4,167,765 | 9/1979 | Watrous | 360/104 |
| 4,853,812 | 8/1989 | Daito et al. | 360/104 |
| 4,922,356 | 5/1990 | Yamaguchi et al. | 360/103 |
| 5,019,931 | 5/1991 | Ohwe et al. | 360/104 |
| 5,077,713 | 12/1991 | Takizawa et al. | 360/114 |

FOREIGN PATENT DOCUMENTS 58-159524 3/1985 Japan.
59-197415 4/1986 Japan.

Primary Examiner—Dale M. Shaw
Assistant Examiner—Diane E. Smith
Attorney, Agent, or Firm—Guy W. Shoup; Patrick T. Bever

[57] ABSTRACT

A magnetic head for photo-magnetic recording wherein an adaptor is attached to the distal end of a load beam, and a slider is joined to the adaptor via a flexure. A flat portion of the adaptor to which is attached the flexure is inclined at a given angle in the radial direction of a photo-magnetic disk, or the flat portion of the adaptor and a tongue of the flexure are inclined at respective given angles in the rotational direction of the photo-magnetic disk. The sliding mounting height is set optionally, a static attitude of the slider is held horizontally and stably, and the head is reduced in size and weight to permit high-speed access.

3 Claims, 3 Drawing Sheets

MAGNETIC HEAD FOR PHOTO-MAGNETIC RECORDING

This application is a continuation of application Ser. No. 07/626,646, filed Dec. 12, 1990 now abandoned.

BACKGROUND OF THE INVENTION

The present invention relates to a magnetic head for magnetic modulation which is used in a photo-magnetic recording device to implement magnetic modulation recording.

A magnetic head for magnetic modulation which is used in a photo-magnetic recording device to implement magnetic modulation recording generally has a support structure as shown in FIG. 4. Specifically, as with a floating type magnetic head for use in typical magnetic disk devices, a magnetic head 200 is structured such that a slider 5 incorporating a magnetic core therein is joined to a flexure 4 to which a load beam 2 is attached.

When the above support structure of the magnetic head 200 in the prior art is employed, the distance from a tip end of the load beam to the sliding surface of the slider (hereinafter referred to as a slider mounting height) is currently on the order of 1 mm in a floating type magnetic head for use in typical magnetic disk devices. Meanwhile, the slider mounting height of the magnetic head 200 for magnetic modulation to be employed in a photo-magnetic recording device must be on the order of 2.5 mm or more because of use of a cartridge disk. In order to provide the required slider mounting height, if the thickness of the slider 5 is merely increased, the slider 5 becomes much thicker than a conventional floating type magnetic head. Accordingly, while the point at which lifting force is acting on the slider remains fixed as it is, the center of gravity of the slider is shifted upwards (away from the load beam 2 and flexure 4), whereby the slider is prone to imbalance during operations of head access. This may result in a danger that the slider is so greatly inclined in the direction of head access as to cause a head crush (the slider strikes a surface of the disk). With the above arrangement, therefore, it is practically impossible to achieve high-speed access. As an alternative, if the sizes of other dimensions are also increased along with the thickness of the slider, the center of gravity is not changed with respect to the acting point of the lifting force and the floating stability is reserved. This could diminish the danger of the head crush. However, because the slider weight is increased in proportion to the third power of its outer dimension, the magnetic head becomes too heavy to achieve high-speed access.

SUMMARY OF THE INVENTION

With a view solving the problems mentioned above, an object of the present invention is to provide a magnetic head which can set the slider mounting height to any desired value, which can horizontally and stably hold a static attitude of a slider (i.e., an attitude of the slider with respect to a mount on the assumption of a head loaded state), and which is small enough in size and weight to permit high-speed access.

To achieve the above object, the magnetic head for photo-magnetic recording of the present invention is featured in that an adaptor is attached to the distal end of a load beam, and a slider is joined to the adaptor via a flexure. Preferably, the magnetic head for photo-magnetic recording of the present invention is featured in that a flat portion of the adaptor to which is attached the flexure is inclined at a given angle in the radial direction of a photo-magnetic disk, or that a flat portion of the adaptor to which is attached the flexure and a tongue of the flexure are inclined at respective given angles in the rotational direction of a photo-magnetic disk.

With such an arrangement that the light and highly rigid adaptor having any desired height is attached to the distal end of the load beam as one of components jointly making up the magnetic head, the slider mounting height can be set optionally without raising the center of gravity and increasing the head weight.

Further, with such an arrangement that the flat portion of the adaptor to which is attached the flexure is inclined at a given angle $\theta_1$ in the radial direction of a photo-magnetic disk, or that a flat portion of the adaptor to which is attached the flexure and a tongue of the flexure are inclined at respective given angles $\theta_2$, $\theta_3$ in the rotational direction of a photo-magnetic disk, the magnetic head can always hold its static attitude horizontally and continue its stable travel in a head loaded state.

BRIEF DESCRIPTION OF THE DRAWINGS

FIGS. 1(a)–1(e) are views showing one embodiment of a magnetic head for photo-magnetic recording of the present invention in which: FIG. 1(a) is a plan view, FIG. 1(b) is a front view, FIG. 1(c) is a side view, FIG. 1(d) is a schematic enlarged front view of an adaptor, and FIG. 1(e) is a side view schematically showing respective mounting angles of the adaptor and a flexure;

FIGS. 4(a)–4(c) are views showing a conventional magnetic head in which: FIG. 4(a) is a plan view, FIG. 4(b) is a front view, and FIG. 4(c) is a side view.

DETAILED DESCRIPTION OF PREFERRED EMBODIMENT

Figure 1A:
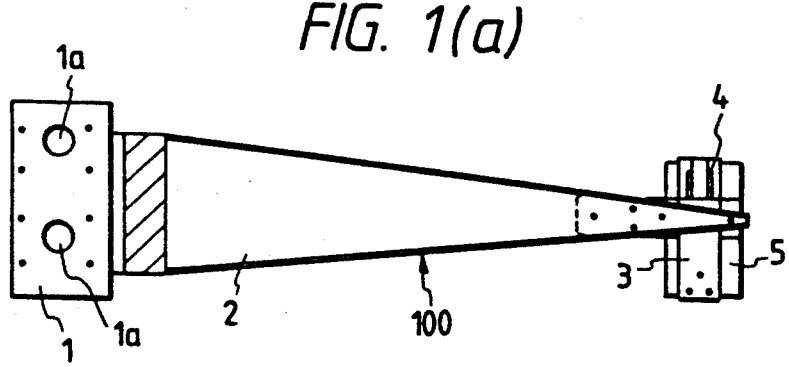
Figure 1C:
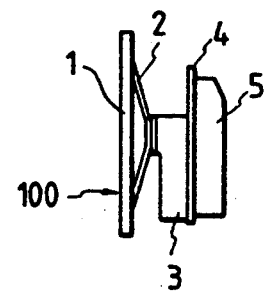
Figure 1B:
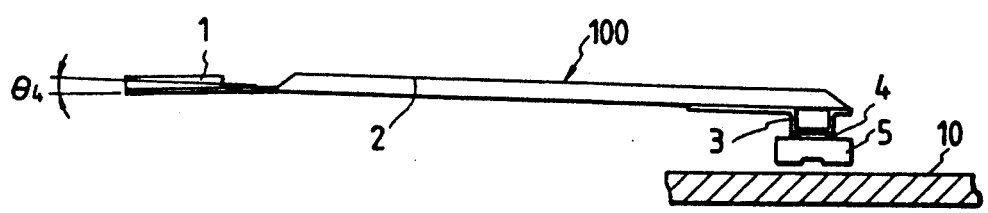
Figure 1D:
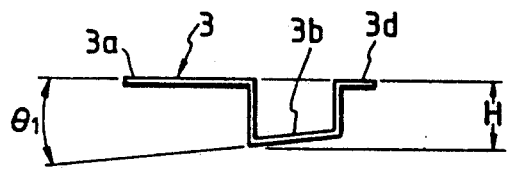
Figure 1E:
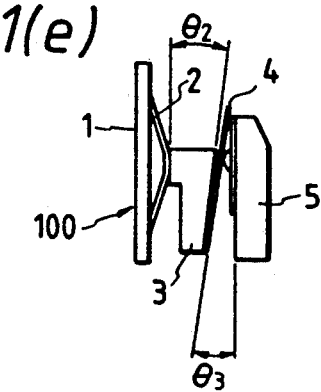
Figure 2A:
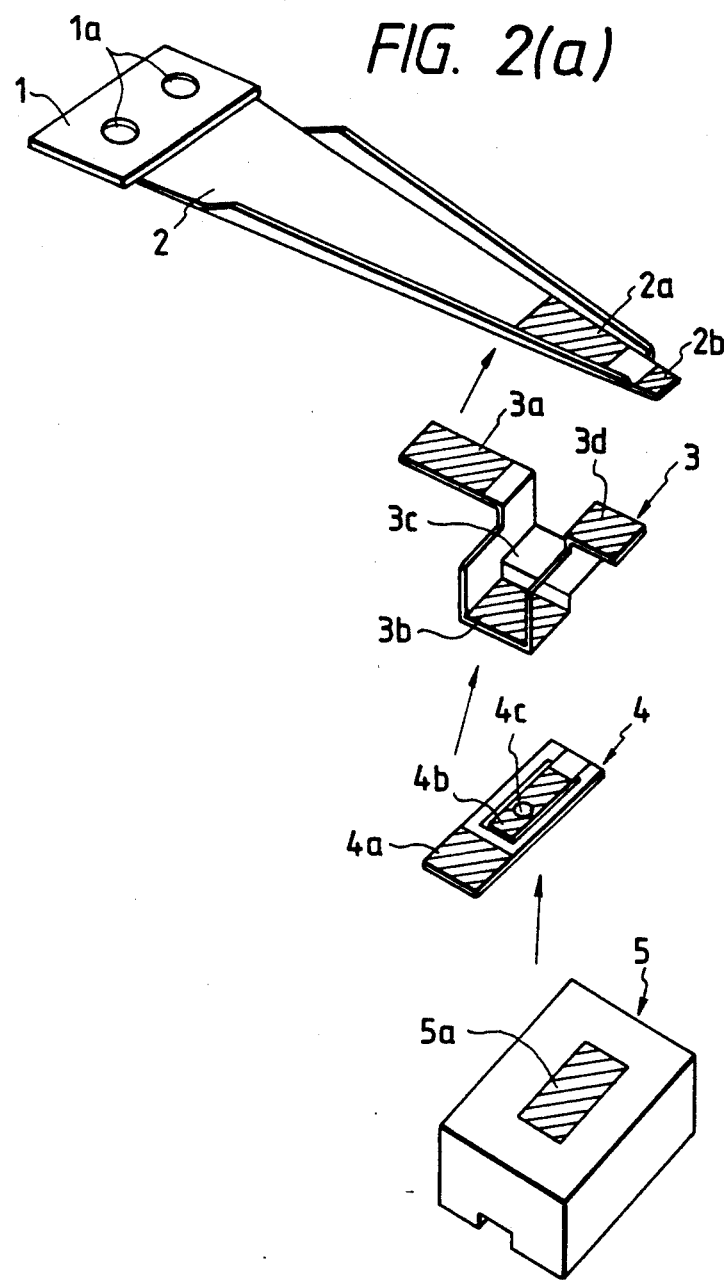
FIG. 2(a) is an exploded perspective view of a magnetic head shown in FIG. 1.

Hereinafter, one preferred embodiment of the present invention will be described with reference to FIGS. 1 and 2. Explaining first an arrangement of the present invention, FIG. 1 illustrates a magnetic head 100 to implement magnetic modulation in photo-magnetic recording devices using cartridge disks, and FIG. 2 is provided for easier understanding of a structure of the magnetic head shown in FIG. 1.

Denoted by reference numeral 1 is a mount made of a stainless steel or the like and having attachment holes 1a through which the mount is combined with a body of a photo-magnetic device. A load beam 2 made of a stainless steel or the like is joined to the mount 1 at a first end by laser welding. An adaptor 3 made of a stainless steel or the like includes an elongated body having an approximate Ω-shape cross section and is joined at a fixed end to the distal end of the load beam 2 on the side opposite to the welded end to the mount 1 by laser welding. Thus, two load beam joining portions 3a and 3d of the adaptor 3 are joined to the rear surfaces of two distal end portions 2a and 2b of the load beam 2, respectively. Connected to load beam joining portions 3a and 3d are side portions 3e which extend in a direction away from the load beam 2. A top flat portion 3b is connected to the side portions 3e such that top flat portion 3b is disposed at a desired distance from load beam 2. Further, a flexure 4 made of a stainless steel or the like is joined to the adaptor 3 by laser-welding the rear surface of the top flat portion 3b of the Ω-shaped adaptor which is located at a free end of the adaptor 3, to an adaptor joining portion 4a of the flexure 4. A slider 5 incorporating a magnetic core therein is joined at its flexure joining portion 5a to the rear surface of a tongue 4b of the flexure 4 by adhesive resin or the like.

Note that although the present invention concerns with the support structure of a magnetic head and, therefore, includes a magnetic core, a coil and lead wires necessary to complete an electric circuit for the magnetic head, these components are omitted from the drawings. Also, the above-described mount 1, load beam 2, adaptor 3, flexure 4 and slider 5 are abridged or simplified in their configurations not relating to the principal structure.

The magnetic head 100 described above is air-floated to be held away from a photo-magnetic disk 10 through any desired distance (usually about several hundreds millimeters to several micrometers in the present state).

Figure 4A:
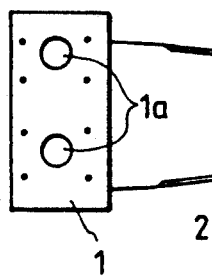
Figure 4C:
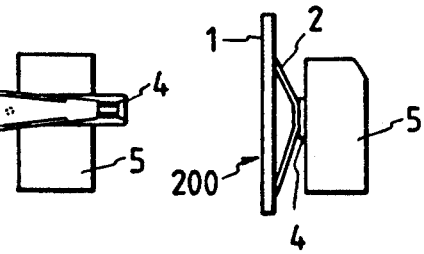
Figure 4B:
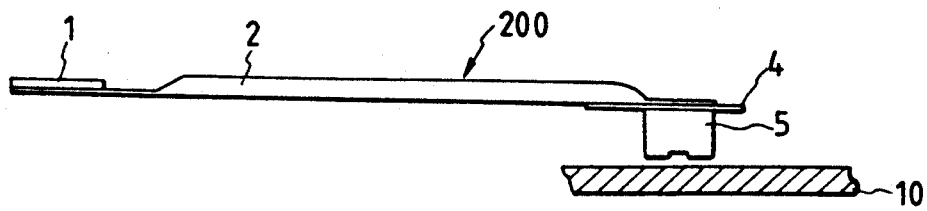

Next, features of respective components making up the magnetic head 100 will be described. As explained above in connection with the prior art and shown in FIG. 4, the magnetic head 200 with the conventional support structure comprises a mount 1, load beam 2, flexure 4 and slider 5. The magnetic head 100 explained above as one embodiment of the present invention is basically identical to the prior art in arrangements of the mount 1, load beam 2 and flexure 4, but different therefrom in that the slider 5 is reduced in its thickness and the adaptor 3 is used as a novel part to compensate for the reduced thickness of the slider 5.

Figure 3:
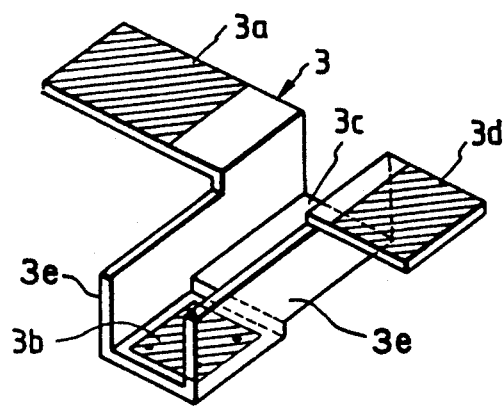
FIG. 3 is a perspective view showing one embodiment of the adaptor used in the present invention.

FIG. 3 shows a perspective view of the adaptor 3 in detail. The adaptor 3 is bent into an approximate Ω-shape and has the pair of the load beam joining portions 3a, 3d each located on either one side of the flat surface portion 3b of the Ω-shaped adaptor. Those load beam joining portions 3a, 3d are also positioned on the opposite sides of a bridge 3c, respectively, to be thereby connected together. The adaptor 3 is configured such that the top flat portion 3b of the Ω-shaped adaptor makes a given angle $\theta_1$ with respect to the load beam joining portions 3a, 3d in the longitudinal direction of the load beam 2 as shown in FIG. 1(d), and it also makes a given angle $\theta_2$ in the transverse direction as shown in FIG. 1(e). Moreover, the top flat portion 3b of the Ω-shaped adaptor is vertically stepped down from the bridge 3c as will be seen in FIG. 3.

Figure 2B:
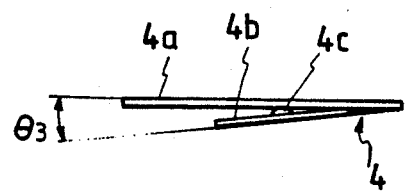
FIG. 2(b) is a side view of the flexure.

FIG. 2(b) shows a configuration of the flexure 4. The adaptor joining portion 4a makes a given angle $\theta_3$ with respect to the tongue 4b.

With the present invention, as described above, since the light and highly rigid adaptor 3 having any desired height H is attached to the distal end of the load beam 2, the slider mounting height can be set optionally to constitute the magnetic head 100 for magnetic modulation in a desired manner. Use of the adaptor 3 enables a reduction in the thickness of the slider 5 and hence the weight thereof, making it possible to achieve high-speed access. In addition, the weight of the adaptor is much lighter than that of the slider to keep the center of gravity as low as possible. As a result, the floating stability will not be degraded during operations of high-speed access.

Further, since the top flat portion 3b of the adaptor 3 to which is attached the flexure 4 is inclined at the given angle $\theta_1$ in the longitudinal direction of the load beam, or it is inclined at the given angle $\theta_2$ in the longitudinal direction of the flexure, or it has both the inclinations $\theta_1$ and $\theta_2$, the magnetic head for magnetic modulation can be constituted with such desired properties that the magnetic head 100 is able to always hold its static attitude horizontally and continue stable travel in the head loaded state.

Usually, the inclination $\theta_1$ is equal to a bending angle $\theta_4$ of the load beam in the head loaded state, and the inclination $\theta_2$ is equal to the opening angle $\theta_3$ of the flexure. The bending angle $\theta_4$ of the load beam is often set from requirements on the device side and for optimization of spring characteristics. Although the opening angle $\theta_3$ of the flexure is originally set to cancel the bending angle $\theta_1$ of the load beam in floating type magnetic heads for magnetic disk devices, it serves in the present magnetic head for magnetic modulation to reduce a drawback due to projection or jut-out of an adhesive resin when the slider is bonded to the flexure, and also allow direct use of conventional floating type magnetic heads for magnetic disk devices. The drawback due to the resin projection is caused upon the resin being projected to such an extent as to deposit on peripheral edges surrounding the tongue. More specifically, the gap between the tongue and the surrounding peripheral edges becomes greater in a flexure with the large opening angle than in a flexure with the small opening angle. Therefore, the projected resin is less likely to deposit on the surrounding peripheral edges. If the resin is deposited and solidified onto the surrounding peripheral edges, the floating stability would be degraded remarkably owing to disablement of or departure from a one-point support mechanism of the flexure. Thus, by configuring the adaptor to have the given inclinations $\theta_1$ and $\theta_2$, it is possible to set the bending angle $\theta_4$ of the load beam and the opening angle $\theta_3$ of the flexure to respective optimum values independently of each other, for thereby holding the static attitude of the magnetic head always parallel to the photo-magnetic disk.

What is claimed is:

1. A magnetic head for a photo-magnetic recording device, said magnetic head comprising:

a load beam connected at a first end to said photo-magnetic recording device, said load beam having a distal end disposed adjacent a surface of a photo-magnetic disk, said load beam extending from said first end to said distal end along a first longitudinal direction;

an adaptor attached adjacent said distal end of said load beam, said adaptor including an elongated body connected at a fixed end to said load beam and extending in a second longitudinal direction perpendicular to the first longitudinal direction, said elongated body including parallel first and second side portions extending away from said load beam, said elongated body also including a flat portion rigidly connected to said first and second side portions at a free end of said elongated body such that the flat portion is disposed at a distance from said load beam;

a flexure rigidly connected to said flat portion of said elongated body, and a slider rigidly connected to said flexure.

2. A magnetic head of claim 1, wherein said first side portion is between said second side portion and said distal end, and said first side portion is shorter than said second side portion such that said flat portion is inclined in the first longitudinal direction toward said distal end.

3. A magnetic head of claim 2, wherein said flat portion of said adaptor to which is attached said flexure and a tongue of said flexure to which is attached said slider are inclined at respective given angles in a rotational direction of a photo-magnetic disk.

* * * * *